Patented June 21, 1927.

1,633,534

UNITED STATES PATENT OFFICE.

BERNARD LONG, OF PARIS, FRANCE, ASSIGNOR TO SOCIÉTÉ ANONYME DES MANUFACTURES DES GLACES & PRODUITS CHIMIQUES DE SAINT-GOBAIN, CHAUNY & CIREY, OF PARIS, FRANCE.

GLASS AND PROCESS OF MAKING THE SAME.

No Drawing. Application filed January 12, 1926. Serial No. 80,840.

It has been common practice to use glasses containing oxide of lead, or oxides of lead and barium as means of absorbing X-rays, and rays of a similar short wave length. Generally speaking, lead glasses of this type and for this purpose, must contain over fifty per cent of oxide of lead and lead-baryta glasses must contain a content of lead oxide between twenty and fifty per cent and of barium oxide between ten and forty per cent, in reverse order.

Glasses of the above barium or lead contents are very fluid at fining temperatures, (1,400° to 1,450° C.) and become viscid very slowly with a drop of temperature so that it is necessary to cool them down to about 900° centigrade before their viscosity is such as to permit them to be worked by ordinary processes. This results in great inconvenience in the manufacture of such glasses in necessitating great variation in the temperature conditions (1,400 to 900° C.) between the fining and working temperatures, being wasteful of heat and destructive on the furnace parts. Moreover it greatly slows up the rate with which the furnace can be worked. The present invention has for its end to remedy these inconveniences in working glasses of this type by incorporating therein oxide of zirconium, I having found that such oxide not only causes the viscosity of the glass to increase more rapidly with a drop in temperature, but in itself increasing the opacity to the rays in question. My invention therefore contemplates substituting in known glasses of the type specified, for some of the silica heretofore used therein, a restricted percentage of zirconium oxide, the percentage of zirconium oxide used being as high, in some cases, as 10%.

The substitution above named may be accomplished by introducing into the batch either oxide of zirconium ($ZrO_2$), or zircon ($ZrSiO_4$) which latter I have found has more advantageous melting qualities than the zirconium oxide.

The following is an example of the analytical composition of a lead flint glass containing zirconium, falling within the scope of this invention,—

| | Per cent. |
|---|---|
| $SiO_2$ | 30 |
| $ZrO_2$ | 5 |
| $PbO$ | 60 |
| $K_2O$ | 5 |

It will be noted that in the above composition I have a lead content of 60%, but the glass nevertheless has good working properties.

Having thus described my invention what I claim as new and desire to secure by Letters Patent is:—

1. A glass having high absorption for short rays such as the X-rays, containing a large percentage of X-ray absorbing oxides tending to decrease changes of fluidity of the glass with change of temperature conditions, and also containing zirconium oxide.

2. A glass containing a large percentage of lead oxide and also containing zirconium oxide under ten per cent.

3. A glass containing over twenty per cent lead oxide and under ten per cent zirconium oxide.

In testimony whereof I hereunto affix my signature.

BERNARD LONG.